United States Patent
Drabarek

(10) Patent No.: US 6,741,355 B2
(45) Date of Patent: May 25, 2004

(54) SHORT COHERENCE FIBER PROBE INTERFEROMETRIC MEASURING DEVICE

(75) Inventor: Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 09/990,207

(22) Filed: Nov. 20, 2001

(65) Prior Publication Data

US 2002/0109847 A1 Aug. 15, 2002

(30) Foreign Application Priority Data

Nov. 20, 2000 (DE) .......................... 100 57 539

(51) Int. Cl.[7] ................................ G01B 9/02
(52) U.S. Cl. ........................ 356/482; 356/479
(58) Field of Search .................. 356/241.1, 241.3, 356/477, 479, 482, 496, 497; 250/227.19, 227.27, 234, 235, 236

(56) References Cited

U.S. PATENT DOCUMENTS

| | | | |
|---|---|---|---|
| 5,044,339 A | | 9/1991 | Hafner |
| 5,101,453 A | * | 3/1992 | Rumbaugh .................. 385/12 |
| 5,381,504 A | * | 1/1995 | Novack et al. ............. 385/128 |
| 5,781,297 A | | 7/1998 | Castore |
| 6,008,898 A | * | 12/1999 | Furstenau et al. .......... 356/519 |
| 6,134,003 A | * | 10/2000 | Tearney et al. ............. 356/450 |
| 6,490,046 B1 | * | 12/2002 | Drabarek et al. ........... 356/489 |

FOREIGN PATENT DOCUMENTS

| | | |
|---|---|---|
| DE | 39 03 000 | 8/1990 |
| DE | 198 08 273 | 9/1999 |
| DE | 198 19 762 | 11/1999 |
| EP | 0 126 475 | 11/1984 |
| GB | 2 136 956 | 9/1984 |

* cited by examiner

Primary Examiner—Samuel A. Turner
Assistant Examiner—Michael A. Lyons
(74) Attorney, Agent, or Firm—Kenyon & Kenyon

(57) ABSTRACT

An interferometric measuring device for measuring surface characteristics, shapes, distances, and distance variations, e.g., vibrations, in particular in narrow, hollow spaces, of measuring objects, having a probe part and an optical fiber. Surface dimensions are able to be measured, even in very fine bore holes, in that, in a measuring head, at the free end of the probe part approaching the measuring object, the optical fiber projects out and is itself designed as a measuring fiber for illuminating a point of measurement and for picking up measuring light coming from this measuring point.

8 Claims, 1 Drawing Sheet

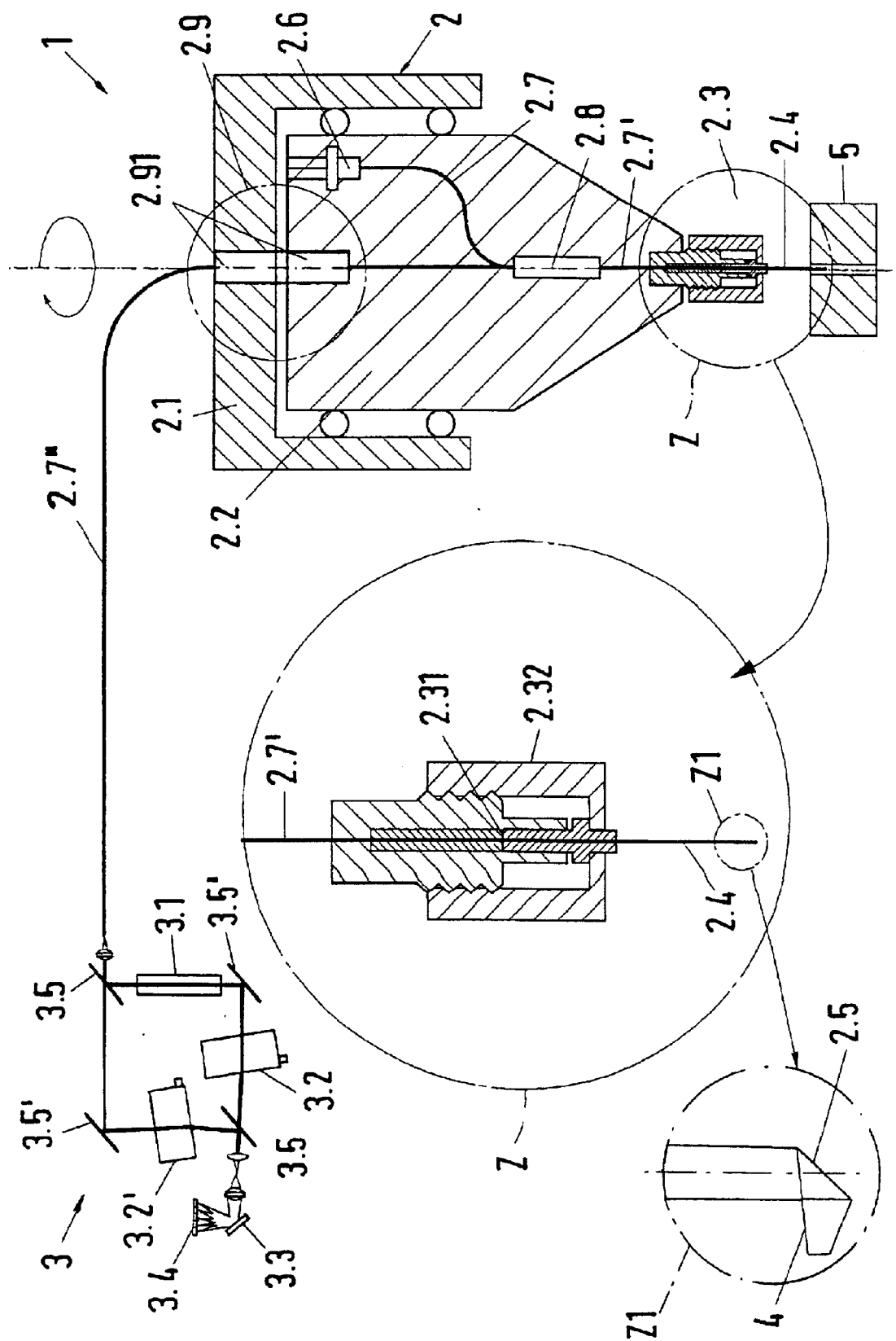

SHORT COHERENCE FIBER PROBE INTERFEROMETRIC MEASURING DEVICE

FIELD OF THE INVENTION

The present invention is directed to an interferometric measuring device having a probe part and an optical fiber. The measuring device is for measuring surface characteristics, shapes, distances, and distance variations, e.g., vibrations, in particular in narrow, hollow spaces of measuring objects.

BACKGROUND INFORMATION

An interferometric measuring device of this kind is known from the German Published Patent Application No. 198 08 273. In the case of this known measuring device, the interferometric measuring system utilizes coherence multiplexing to split the measuring device's optical system into two subsystems, one designated as modulation interferometer and one as a probe part. The result is a probe part which is easy to manipulate and which has a measuring head that facilitates measurements in relatively long, narrow bore holes. The measuring device is designed for a multiple-wavelength interferometry, so that an expansion of the measuring range is achieved. However, there are bore holes whose dimensions are so narrow that even a measuring head of this kind can no longer be used.

German Published Patent Application No. 198 19 762 proposes another interferometric measuring device of this type which includes various space-saving measuring probes for the measuring system.

European Published Patent Application No. 0 126 475 describes a method and a device for the contact-free measurement of actual positions and/or of rough surface profiles, which is based on the concept of a multiple-wavelength heterodyne interferometer and, as a light source, includes one or more lasers. By employing phase analysis, the heterodyne technique makes it possible to substantially suppress measuring errors.

SUMMARY OF THE INVENTION

The underlying object of the present invention is to provide an interferometric measuring device of the type indicated at the outset which will enable measurements to be performed as accurately as possible, even in still narrower hollow spaces, such as those smaller than one millimeter, as occur when working with injection nozzles.

According to the present invention, in a measuring head, at the free end of the probe part approaching the measuring object, the optical fiber projects out and is itself designed as a measuring fiber for illuminating a point of measurement and for picking up measuring light coming from this measuring point. The measuring fiber, whose diameter is within the range of less than 100 $\mu$m, for example, may be driven with its free end into very thin bore holes and illuminate the surface area to be measured and, from there, receive light, in order to retransmit it to an evaluation device that is known per se and that works, in particular, in accordance with the principle of phase analysis.

In this context, to achieve an exact illumination, as well as precise pick-up of the measuring light, the measures are advantageous which provide for designing the free end region of the measuring fiber to illuminate a point of measurement and to pick up the measuring light in dependence upon the measuring task.

Other advantageous embodiments for attaining a precise measuring result provide for polishing the free end region, providing it with a diaphragm, configuring it as a lens or prism, treating it against disturbing reflected light, beveling, reflection-coating, or antireflection-coating it, or providing it with a combination of these measures.

For purposes of beam shaping or beam guidance, the unattached end region of the measuring fiber is finely worked in that it is provided with a drop of adhesive and/or is roughened.

A further advantageous measure for the transmission and analysis of light provides for the measuring fiber to be a monomode fiber.

Various possible embodiments are derived from an interferometer design which corresponds to a classic interferometer, a white light interferometer, or to a heterodyne interferometer. In white light interferometry, a broadband, short-coherent light source, such as a superluminescent diode or similar light source, is utilized, and the maximum of the interference contrast is analyzed, as is known per se.

Interferometers of the mentioned type are also described in greater detail in the publications mentioned at the outset. In general, classic interferometers are likewise widely used.

To advantageously expand the measuring range, i.e., increase the range of unambiguity, for example, the interferometer is designed as a multiple-wavelength interferometer. With respect to procedural details, reference is likewise made to the related art mentioned at the outset.

If provision is made in the probe part for a fiber section to be preconnected to the measuring fiber and for the interface between the fiber section and the measuring fiber to be utilized as a beam-splitter surface for forming a reflected reference wave and a transmitted measuring wave, then the measuring fibers are easily interchangeable, and the measuring head may be equipped for different measuring tasks. At the same time, the interface is expediently utilized for the interferometric design, so that, for example, no additional reflecting surface is required for the reference beam. In this context, a beneficial measure for a simple design is for the connection between the measuring fiber and the fiber section to be designed as a fiber coupler.

Simple manipulation of the measuring device is also advantageously provided in an embodiment where, for purposes of illumination, a short-coherent light source is positioned in a modulation interferometer that is remote from the probe part and linked thereto via an optical fiber, or is positioned in the probe part, which is then linked via an optical fiber to a remote demodulation interferometer, and where the coherence length of the light source is shorter than one half of the difference between a path length of a reference wave and a path length of a measuring wave.

In partitioning the design into the probe part and the demodulation interferometer, it is expedient, in this context, for the light from the light source to be channeled via an additional optical fiber and a fiber beam splitter into the fiber section and, once the point of measurement is illuminated, out of this, into the optical fiber.

If provision is also made for the probe part to have a fixed probe part and, rotationally mounted therein, a probe part which is rotatable with the measuring head, then an all-around measurement may be performed in simple fashion.

BRIEF DESCRIPTION OF THE DRAWING

The FIGURE shows an interferometric measuring device according to the present invention.

DETAILED DESCRIPTION

The FIGURE shows an interferometric measuring device 1 having a probe part 2 and, remotely therefrom, a demodulation interferometer 3 that is connected via an optical fiber 2.7". The probe part has a fixed probe part 2.1 and, rotationally mounted thereon, a rotatable probe part 2.2, which, at its front region facing a measuring object 5, is designed as a measuring head 2.3.

At its end region that is insertable into a narrow bore hole of measuring object 5, measuring head 2.3 is provided with a thin optical fiber fashioned as a measuring fiber 2.4, which, for example, has a diameter of 125 μm and is coupled by a fiber coupling 2.32 to a fiber section 2.7' of probe part 2. More clearly apparent in detail view Z, at the coupling site between measuring fiber 2.4 and fiber section 2.7', is the formation of an interface, which is designed as a beam-splitter surface 2.31 and is used for generating a reference wave reflected off of the same and a traversing measuring wave.

As is evident from detail view Z1, the free end region of measuring fiber 2.4 is fashioned as an end piece 2.5 for illuminating a measurement point of measuring object 5 and for picking up reflected measuring light 4. It is, in fact, beveled and mirrored. As mentioned at the outset, however, there are ways to design end piece 2.5 and to adapt it to various measuring tasks.

Also positioned in probe part 2 is a short-coherent light source 2.6. It is used for coherence multiplexing, to achieve an interference-free transmission of the measuring wave and of the reference wave between probe part 2 and demodulation interferometer 3. The light from short-coherent light source 2.6, e.g., a superluminescent diode, is channeled via a further optical fiber 2.7 and transmitted by a fiber beam splitter 2.8 into fiber section 2.7' and, from there, into measuring fiber 2.4. The light returning from the point of measurement, in turn, passes through fiber beam splitter 2.8 and, from there, is conducted via an optical coupler 2.9 in the region of the rotational mount, and further optical elements in the form of GRIN (graduate-index) lenses 2.91, into further optical fiber 2.7".

Similarly to the modulation interferometers described in the publications mentioned at the outset, the demodulation interferometer includes a delay element 3.1, modulators 3.2, 3.2', e.g., acoustooptical modulators, a spectral element 3.3, a photodetector array 3.4, and light-guide elements 3.5, 3.5'.

The light from short-coherent light source 2.6 is coupled into the preferably monomode optical fiber 2.7 and, via fiber beam splitter 2.8, arrives at beam-splitter surface 2.31, where it is split into the measuring wave and the reference wave. The reference wave is coupled back into fiber section 2.7' and is channeled, via optical coupler 2.9, into demodulation interferometer 3. The measuring wave is coupled out of measuring fiber 2.4, whose end is polished and mirrored at an angle of, for example, 45°, and illuminates the inner wall of a small bore hole to be measured, having a diameter of, for example, 200 μm, measuring fiber 2.4 having a diameter of, for example, 125 μm. Measuring light 4, reflected off of the wall, is coupled via measuring fiber 2.4, fiber beam splitter 2.8, and optical coupler 2.9 into demodulation interferometer 3, and superposed by the reference wave. In the process, the two waves are not able to interfere, since the coherence length of light source 2.6 is shorter than half of the optical path in the measuring fiber.

Demodulation interferometer 3 is constructed, for example, in accordance with the principle of a MachZehnder interferometer. In the demodulation interferometer, the light is split into two beams. In one arm of the demodulation interferometer, delay element 3.1, e.g., a plane-parallel glass plate is used. It cancels the difference which had been forced between the optical paths of the two beam components in measuring head 2.3. The two light beams are shifted in frequency with respect to each other by modulators 3.2, 3.2'. The frequency difference amounts, for example, to a few kHz. The two beam components, which are capable of interference, are superposed in beam splitter 3.5, coupled out, dispersed by spectral element 3.3, e.g., a grating or prism or filter, into a plurality of colors (wavelengths: $\lambda 1$, $\lambda 2$, ... $\lambda_n$), and focused at photodetector array 4. Each photodetector supplies an electric signal having the differential frequency produced by modulators 3.2, 3.2' and a phase $\Delta\Phi$ which relates to measured quantity $\Delta L$ (distance to measuring object 5) and to corresponding wavelength $\lambda v$:

$$\Delta\Phi = (2\cdot\pi/\lambda_n)\cdot\Delta L.$$

By measuring the phase differences among the signals from a plurality of detectors (multiple-wavelength heterodyne interferometry), one is able to clearly define the distance $\Delta L$ to the inner wall of the bore hole, which may be greater than individual light waves.

The information is transmitted from rotating probe part 2.2 to fixed probe part 2.1 via optical coupler 2.9. Optical coupler 2.9 may be designed in the form of the two illustrated GRIN lenses 2.91, which are coupled into the fiber ends. Since optical coupler 2.9 is situated in the optical path following fiber beam splitter 2.8, any manifestation of tilting or displacement of either probe part 2.1, 2.2 does not have a disturbing effect during the rotation.

The actual measuring probe of measuring fiber 2.4 is a very sensitive part (thin fiber) and, for that reason, is also mounted as an easily replaceable element in the form of a connector (fiber coupling 2.32) on rotatable probe part 2.2.

What is claimed is:

1. An interferometric measuring device for measuring surface characteristics, shapes, distance variations, and vibrations, comprising:
    a probe part;
    an optical fiber;
    a measuring head, wherein:
        in the measuring head, at a free end of the probe part approaching a measuring object, the optical fiber projects out and corresponds to a measuring fiber for illuminating a point of measurement and for picking up a measuring light coming from the point of measurement;
        a fiber section arranged in the probe part, the fiber section being preconnected to the measuring fiber, wherein:
            an interface between the fiber section and the measuring fiber is utilized as a beam-splitter surface for forming a reflected reference wave and a transmitted measuring wave.

2. The measuring device according to claim 1, wherein:
    a connection between the measuring fiber and the fiber section corresponds to a fiber coupler.

3. The measuring device according to claim 2, further comprising:
    a remote demodulation interferometer; and
    a short-coherent light source that is one of positioned in a modulation interferometer that is remote from the probe part and linked thereto via the optical fiber and positioned in the probe part, which is then linked via the optical fiber to the remote demodulation interferometer, wherein:

a coherence length of the short-coherent light source is shorter than one half of a difference between a path length of a reference wave and a path length of a measuring wave.

4. The measuring device according to claim 3, further comprising:

an additional optical fiber; and a fiber beam splitter, wherein:

light from the short-coherent light source is channeled via the additional optical fiber and the fiber beam splitter into the fiber section and, once the point of measurement is illuminated, out of the fiber section into the optical fiber.

5. The measuring device according to claim 1, wherein: the probe part includes:

a fixed probe part, and another probe part, rotationally mounted therein, that is rotatable with the measuring head.

6. The measuring device according to claim 1, wherein:

the free end region of the fiber is one of: i) polished, ii) provided with a diaphragm, iii) configured as one of a lens and a prism, iv) treated against disturbing reflected light, v) beveled, vi) reflection-coated, vii) antireflection-coated, and viii) provided with a combination of being polished, provided with the diaphragm, configured as one of the lens and the prism, treated against disturbing reflected light, beveled, reflection-coated, and antireflection-coated.

7. The measuring device according to claim 6, wherein:

the free end region of the fiber is at least one of: i) provided with a drop of adhesive, and ii) roughened.

8. The measuring device according to claim 1, wherein:

the measuring fiber is a monomode fiber.

* * * * *